United States Patent Office 3,336,145
Patented Aug. 15, 1967

3,336,145
NITROCELLULOSE COATING COMPOSITION PLASTICIZED WITH OXAZOLINES
Robert F. Purcell, Terre Haute, Ind., assignor to Commercial Solvents Corporation, New York, N.Y., a corporation of Maryland
No Drawing. Filed Mar. 20, 1964, Ser. No. 353,586
20 Claims. (Cl. 106—176)

This invention generally relates to nitrocellulose coating compositions. In a particular aspect it relates to novel nitrocellulose coating compositions containing, inter alia, certain oxazolines.

Nitrocellulose coating compositions are well-known compositions widely used throughout industry. Although their formulation is an art and there are numerous variations, they are fundamentally composed of relatively non-volatile solids dissolved or suspended in relatively volatile liquids. The solids include nitrocellulose, plasticizers, hard resins and often pigments. Although many plasticizers are liquids, they are usually classed as a part of the solids content because they are not volatilized during the drying process but remain in the coating. When such coating compositions are applied to the article to be coated, the volatile liquids evaporate thereby leaving a film or coating on the article. This film contains the non-volatile solids and plasticizer and although the film contains solids other than nitrocellulose, the coating industry usually calls such a film a nitrocellulose film.

Nitrocellulose gives desirable characteristics to a coating; however, it is generally used only with plasticizers and hard resins because when it is used alone in the coating composition, the resulting coating is too brittle to be satisfactory, chalks badly due to deterioration by sunlight, and tends to crack. This cracking is generally denominated in the coatings art as checking.

Another characteristic of nitrocellulose coating compositions is that when they are applied to a porous substrate, such as wood, there is a tendency for a substantial proportion of the newly-applied coating to be absorbed so that the coat does not lie on the surface, and additional coats are necessary. Some formulations are not absorbed to the extent that others are, and those resisting absorption are said to possess good "hold out." The term "hold out" is also generally used to describe any situation in which a coating does not sink into the substrate, which may be the object to be coated or it may be a previously applied coat.

The usual practice for coating wooden and other absorptive surfaces is to apply a preliminary sealer coat, which, after drying, must be sanded and polished before the top coat is applied in order to achieve a smooth finish. It is therefore desirable for the sealer coat to be sufficiently brittle that it can be easily sanded, yet be sufficiently resistant to low temperatures that checking does not develop. It is a function of the plasticizer to provide the desirable balance of properties.

A sealer coat is not used for metallic surfaces, but instead a primer coat especially formulated for good adherence to the metal is used. A top coat is applied over the primer coat to form a non-porous durable finish. It is desirable that the top coat show good hold out, and both primer and top coat should exhibit good flexibility and impact resistance as well as good resistance to chalking.

In formulating nitrocellulose coating compositions, it is frequently desirable to minimize the volatiles portion and maximize the solids portion so that thick coatings can be achieved. Viscosity of the coating composition is an important factor on the solids content that can be employed. If the solids content is too high, the resulting viscosity makes the coating composition unsatisfactory for spraying, and when applied to the surface, it does not flow and level to a smooth finish. It is therefore desirable to formulate a coating composition containing high solids but without excessive viscosity.

It is old art to incorporate plasticizers in coating compositions to contribute flexibility to the coating and hard resins to overcome the softening effect of the plasticizer.

A large number of plasticizers is available to manufacturers of coating compositions. Generally the non-volatile esters have been the most widely used but camphor, blown castor oil, blown soya oil, and those alkyd resins (esters of dibasic acids with such polyols as ethylene glycol, glycerol, pentaerythritol and the like) having suitable properties have also been widely used.

Although plasticizers greatly improve the ability of nitrocellulose coatings to withstand flexing, abrasion and resistance to wide temperature fluctuations, the plasticizers heretofore used frequently are not accepted as entirely satisfactory from the standpoint of the combination of properties considered desirable. For example, the previously used plasticizers have not contributed notably to chalk resistance. The oxazoline plasticizers of this invention impart many desirable properties to coatings and specifically, they improve chalk resistance and hold out.

It is an object of this invention to provide new and useful nitrocellulose coating compositions.

Another object is to provide nitrocellulose coating compositions plasticized with certain oxazolines which coating compositions possess desirable properties.

These and other objects and advantages of this invention will be apparent to those skilled in the art from the description of this invention.

It has been discovered that nitrocellulose coating compositions comprising nitrocellulose and plasticizing amounts of certain oxazolines possess highly desirable properties with respect to hold out, flexibility, chalk resistance, and resistance to checking. Further, the nitrocellulose coating compositions of this invention can be formulated to contain a relatively high proportion of solids while achieving desirable viscosity characteristics. Oxazolines are generally well-known compounds and they are commercially available.

The oxazolines employed in the compositions of this invention are selected from the group consisting of A, B, C, D, E, F, G, H and mixtures thereof wherein:

A is an oxazoline represented by the formula

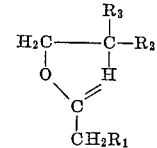

wherein $R_1$ is selected from a group consisting of hydrogen and saturated and unsaturated alkyl radicals containing from 1 to about 20 carbon atoms. $R_2$ and $R_3$ are selected from the group consisting of hydrogen, alkyl and alkylol radicals, and

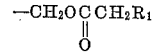

Preferably the $R_2$ and $R_3$ alkyl and alkylol radicals contain from 1 to 5 carbon atoms.

B is an oxazoline represented by the formula:

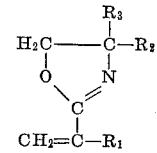

C is a polymeric oxazoline reaction product obtained by partially polymerizing B by contacting or blowing with air.

D is an oxazoline reaction product obtained by reacting B with a compound having a terminal group represented by the formula

selected from the group consisting of ethylene, propylene, isobutylene, acrylonitrile, methylmethacrylate, ethylmethacrylate, butyl methacrylate, octyl methacrylate, cyclohexyl methacrylate, methoxymethyl methacrylate, n-butoxyethyl methacrylate, n-butoxyethoxyethyl methacrylate, beta-diethylaminoethyl methacrylate, chloroethyl methacrylate, methacrylic acid, ethyl acrylate, alphachloroacrylic acid, vinyl chloride, vinyl fluoride, vinylidene chloride, vinylidene fluoride, vinyl acetate, vinyl trimethylacetate, vinyl hexanoate, vinyl laurate, vinyl chloroacetate, vinyl propionate, vinyl stearate, N-vinyl phthalimide, N-vinyl succinimide, N-vinylcaprolactam, N-vinylbutyrolactam, styrene, methylstyrene, vinyl toluene, vinylnaphthalene, methyl vinyl ketone, vinylpyridine, vinyl isobutyl ether, vinyl ethyl ether, vinyl alcohol and mixtures thereof.

E is an oxazoline polyester reaction product obtained by reacting about one mole of a thermally stable, dicarboxylic acid which does not readily form an anhydride with from about one to about two moles of an oxazoline represented by the formula:

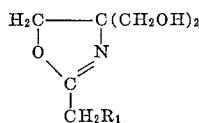

F is an olefinic oxazoline polyester reaction product obtained by reacting E with formaldehyde.

G is an oxazoline reaction product obtained by reacting F with a compound having a terminal group represented by the formula

selected from the same group as hereinabove set forth in describing oxazoline reaction product D.

H is a dioxazoline ester reaction product obtained by reacting about one mole of a dicarboxylic acid with about two moles of an oxazoline represented by the formula

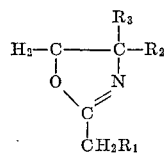

wherein only one of the members $R_2$ and $R_3$ is alkylol.

The following discussion frequently refers to the oxazolines as type A oxazolines, type B oxazolines, etc., as A, B, etc. are referred to above.

The oxazolines employed in this invention are substantially non-volatile liquids or waxy solids. They are readily soluble in the solvents denominated lacquer thinners generally used in the coating composition industry and are compatible with nitrocellulose over a broad range of proportions. In general, nitrocellulose coating compositions containing from about 10 to about 0.05 part by weight of oxazoline to one part by weight of nitorcellulose possess desirable properties. In general, coating compositions having ratios of oxazoline to nitrocellulose below about 0.05 to 1 produce coatings which are relatively hard to brittle and which have relatively poor chalk resistance and poor hold-out properties. On the other hand, coating compositions having ratios of oxazoline to nitrocellulose above about 10 to 1 generally have relatively poor drying characteristics and produce relatively soft coatings which lack abrasion resistance. Nitrocellulose coating compositions containing from about 0.5 to about 2.0 parts of oxazoline to 1 part of nitrocellulose are completely compatible and are specifically preferred because it has been found that such compositions dry effectively and the resulting coating possesses a balance of the desired properties which is considered to be substantially optimum.

Many of the oxazolines useful in this invention are commercially available; all of them are known to the art and all of them may be prepared by methods known to the art.

If either $R_2$ and/or $R_3$ in the oxazoline represented by the general formula

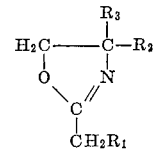

is an alkylol radical, the oxazoline can be reacted with a fatty acid or anhydride to give an ester (type A oxazoline). If $R_2$ and $R_3$ are both alkylol, such an oxazoline can form a diester (type A) or it can be reacted with a thermally stable dicarboxylic acid which does not readily form an anhydride to give an oxazoline polyester (type E oxazoline). If $R_2$ is hydrogen or alkyl and $R_3$ is alkylol, the oxazoline can be reacted with dicarboxylic acids or anhydrides to give dioxazoline esters (type H oxazolines).

The fatty acids or anhydrides which can be used to react with the oxazoline preferably contain from 2 to 22 carbon atoms. They can be saturated, such as acetic, caproic, pelargonic, lauric, myristic, palmitic, stearic, behenic and the like, or they can be unsaturated, such as acrylic, oleic, linoleic, clupanodonic and the like. Many of these acids occur in nature as mixtures with each other and mixtures of these acids are contemplated for use in preparing oxazolines for this invention. Tall oil is a commercially available acid which is suitable for the practice of this invention. It contains several fatty acids of varying degrees of saturation along with the cyclic rosin acids such as abietic acid. Clupanodonic acid occurs in fish oils along with other fatty acids. The crude, readily available, inexpensive mixtures of acids are preferred for this invention for reasons of economy.

The dicarboxylic acids preferably used to react with the di-alkylol oxazolines are those acids which are thermally stable, that is, which do not decompose, at the reaction temperatures, and which do not readily form anhydrides. Dicarboxylic acids which readily form anhydrides react with dialkylol oxazolines to form imides as well as polyesters and these imides are undesirable. For example, in the aromatic series, ortho-phthalic acid and phthalic anhydride react with a dialkylol oxazoline to form the imide, but isophthalic acid and terephthalic acid react with a dialkylol oxazoline to form the polyesters of this invention. Mono-alkylol oxazolines react with dicarboxylic acids to give di-oxazoline esters (type H oxazolines). They do not form imides with anhydrides, so anhydride-forming dicarboxylic acids, as well as the anhydrides, can be used to react with mono-alkylol oxazolines. About one mole of dicarboxylic acid is preferably reacted with about two moles of mono-alkylol oxazoline.

The aliphatic dicarboxylic acids used to form the oxazoline polyesters of this invention (type E oxazolines) can be represented by the general formula $$(CH_2)_x(COOH)_2$$

where $x$ is an integer of 4 to 20 and preferably of from 4 to 8. Oxalic and malonic are thermally unstable at the temperature of reaction and readily lose $CO_2$ upon heating; maleic, succinic, and glutaric acids readily form anhydrides, and fumaric tends to isomerize to maleic under the conditions of the reaction. These acids are, however, suitable for preparing type H oxazolines. The aliphatic dicarboxylic acids preferred for the preparation of oxazoline polyesters of type E and H include adipic, pimelic, suberic, azelaic, and sebacic acids.

The type A oxazolines or type E oxazoline polyesters can be condensed with aldehydes, preferably the lower molecular weight aldehydes containing from 1 to 5 carbon atoms, such as formaldehyde, to introduce an olefinic side chain (type B or F oxazolines). When formaldehyde is used, the olefinic group is vinyl. The olefinic type B oxazoline so produced can be further modified by "blowing" with air to partially polymerize it to obtain a type C oxazoline, as is known in the art or it can be reacted with a compound having a terminal group represented by the formula

to form type D oxazolines. The type F oxazoline polyester can likewise be reacted with a compound having a terminal

group to form a partially polymerized type G reaction product.

The type D and type G oxazoline reaction products can be prepared according to the process described in my copending U.S. patent application, Ser. No. 197,919 filed May 28, 1962, now abandoned. Compounds having a terminal group represented by the formula

are olefins, e.g. ethylene, propylene, isobutylene; acrylyl and alkacrylyl compounds, e.g., acrylic, haloacrylic, and methacrylic acids, esters, nitriles, and amides—for example, acrylonitrile, methyl methacrylate, ethylmethacrylate, butyl methacrylate, octyl methacrylate, cyclohexyl methacrylate, methoxymethyl methacrylate, n-butoxyethyl methacrylate, n-butoxyethoxyethyl methacrylate, aminoalkyl methacrylates such as betadiethylaminoethyl methacrylate, chloroethyl methacrylate, methacrylic acid, ethyl acrylate, and alpha-chloroacrylic acid; vinyl and vinylidene halides, e.g., vinyl chloride, vinyl fluoride, vinylidene chloride, vinylidene fluoride, vinyl carboxylates, e.g., vinyl acetate, vinyl trimethylacetate, vinyl hexanoate, vinyl laurate, vinyl chloroacetate, vinyl propionate, and vinyl stearate; N-vinyl imides, e.g. n-vinylphthalimide and N-vinyl succinimide; N-vinyllactams, e.g., N-vinylcaprolactam and N-vinylbutyrolactam; vinyl aryls, e.g. styrene, methyl styrene, vinyl toluene and vinylnaphthalene; and other vinyl derivatives such as methyl vinyl ketone, vinylpyridine, vinyl isobutyl ether, vinyl alcohol, and vinyl ethyl ether.

In preparing the coating compositions of this invention, the nitrocellulose and oxazoline are dissolved in the volatile liquids portion of the coating composition. These volatile liquids or lacquer thinners comprise a mixture of organic solvents and the nitrocellulose and oxazoline are dissolved therein according to mixing techniques well-known in the art. Hard resins are added and, when desired, dyes or pigments, and auxiliary plasticizers may also be added to provide special characteristics as is known to those skilled in the art.

The nitrocellulose employed in this invention is not limited to a particular grade or type, but can be any type generally suitable for the preparation of nitrocellulose coating compositions. The type known as ½ second R.S. is generally used.

Many oxazolines used in the nitrocellulose coating compositions of this invention are available commercially and methods for the preparation of all of the oxazolines are also known in the art. Some methods for the preparation of oxazolines are described in the "Encyclopedia of Chemical Technology," vol. I, pages 824 to 831, 2nd ed., Interscience Publishers. The preparation of some specifically preferred oxazolines is now described.

GENERAL METHOD OF PREPARING OXAZOLINES

An amino alcohol and fatty acid are charged to a kettle and are heated until at least two moles of water have been driven off. When the amino alcohol is mono-alcoholic, only one mole of acid is used and two moles of water are driven off. When the amino alcohol is a diol, one mole of acid gives the oxazoline where $R_2$ is alkyl and $R_3$ is alkylol (or vice versa). If desired, two moles of acid can be employed and three moles of water driven off to given a product where $R_2$ is alkyl as before, but $R_3$ is

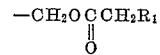

where $R_1$ is alkyl from the fatty acid as represented by the formula $R_1CH_2COOH$. Similarly, one mole of 2-amino-2-hydroxymethyl-1,3-propanediol and three moles of acid gives the oxazoline diester. These are the type A oxazolines.

After the oxazoline is formed, or the ester oxazoline as the case may be, paraformaldehyde can be added to the reaction mixture and another mole of water driven off to form the vinyl oxazoline, or the vinyl oxazoline ester as the case may be (type B oxazolines). Vinyl oxazoline esters can be further treated by "blowing" with air, as is known in the art (type C). Vinyl oxazoline esters and polyesters can be copolymerized with compounds having a terminal

group (type D) if desired. The preparation of these products is illustrated by the following specific preparations of a vinyl oxazoline ester of tall oil acids, and a vinyl soya acid oxazoline isophthalic polyester and the styrene copolymer thereof.

SPECIFIC METHODS OF PREPARING OXAZOLINES

A closed kettle equipped with an agitator and a gas sparging line is used. The kettle is first swept free from oxygen with an inert gas such as $CO_2$, $N_2$, or gas mixture from a gas generator. Air is preferably excluded from the kettle to prevent color development. Tall oil fatty acid, 1680 grams, is charged to the kettle, then 2-amino-2-hydroxymethyl-1,3-propanediol, 243 grams, is added. The mole ratio of fatty acid to amino alcohol is 3:1. Heat is slowly applied to bring the temperature to about 140–150° C. During this heating period, water of reaction is formed but is retained by the reaction mixture. At about 140–150° C. water is released rapidly and heat input must be carefully controlled to prevent excessive foaming. When the temperature rises to 160° C. and water is coming off smoothly, the heat is applied more rapidly until the temperature reaches 230° C. The reaction mixture is maintained at this temperature until an acid number of about 7–10 is reached. About 144 g. of water, equal to about four moles per mole of amino alcohol has been driven off.

The product obtained is the oxazoline diester of tall oil acids. It can be cooled and used without further treatment, or it can be reacted with paraformaldehyde to add a vinyl radical, in which case the reaction product is cooled to about 100–120° C. maintaining the inert atmosphere, then parafomaldehyde, 65 grams, is added. Heat is again applied and the temperature of the reaction mixture is slowly raised to 190° C. Another mole of water per mole of amino alcohol is released. As dehydration begins, the acid number of the reaction mixture starts to increase and continues until a maximum is reached and it then slowly falls. The temperature is maintained at 190° C. until the acid number returns to that obtained before parafomaldehyde treatment. The mixture is then cooled under an inert atmosphere to about 120° C. and the kettle is then emptied. If desired, this product can be partially polymerized, or "blown" by passing air through it until the desired viscosity is reached.

The vinyl soya oxazoline polyester of isophthalic acid is another type of oxazoline useful in the practice of this invention. In this instance, $R_2$ and $R_3$ of the general formula are alkylol groups which have been reacted with the two carboxylic acid groups of isophthalic acid. Polymeric materials of uncertain structure result from this reaction.

To prepare the vinyl soya oxazoline polyester, soya fatty acids 1056 g. and 2-amino-2-hydroxymethyl-1,3-propanediol 154.5 g. are charged to a kettle blanketed with an inert atmosphere and equipped with an agitator. Heat is applied slowly to avoid foaming until water removal begins and when the temperature reaches about 165–170° C., another 154.5 g. portion of 2-amino-2-hydroxymethyl-1,3-propanediol is added. The heating is continued until a temperature of 180° C. is reached and heating at this temperature is maintained for two hours during which time the oxazoline is formed. $R_1$ of the general formula is provided by the soya acids and $R_2$ and $R_3$ are methylol groups.

If desired, the oxazoline so produced could be used in the practice of this invention. Generally, however, it is preferred to form the isophthalic polyester. The isophthalic polyester may be produced by adding isophthalic acid, 86 g., to the kettle at the end of the two hours heating at 180° C., continuing the heating until a temperature of 200° C. is reached. Then another 86 g. of isophthalic acid is added and heating continued to a temperature of 215° C. at which time a third charge of isophthalic acid, 86 g., is added. The heating is continued until a temperature of 230° C. is reached and this temperature is held until the desired acid number of about 10 is reached.

The product obtained thus far is useful in the practice of this invention, but generally it is preferred to further treat it with paraformaldehyde to add a vinyl group. When treated with paraformaldehyde a type B oxazoline containing a vinyl group will be obtained. This vinyl soya oxazoline isophthalic polyester can be used as such as the plasticizer of this invention or it can be copolymerized with styrene or other unsaturated monomers by the process disclosed in U.S. application Ser. No. 197,919.

Copolymerization of an unsaturated monomer such as styrene with the vinyl group of vinyl oxazoline polyesters is readily carried out. The degree of copolymerization is limited to that producing liquids of high viscosity but without producing the undesirable gels which result at higher levels of styrene. A typical styrenation procedure for preparing an adduct of a vinyl oxazoline polyester is as follows:

| | Grams |
|---|---|
| Vinyl oxazoline polyester | 1439 |
| Styrene | 144 |
| Catalyst (ditertiary butyl peroxide) | 8.6 |
| Xylol (solvent) | 677 |

PROCEDURE

Charge about four-fifths of the xylol, the oxazoline, about one-fifth of the styrene and about one-fifth of the catalyst into a kettle and heat to 135–140° C. Separately mix the remainder of the styrene, xylol and catalyst, place the mixture in a dropping funnel and add the mixture gradually over a period of about 45 minutes to an hour to the kettle maintaining the temperature at 135–140° C. Heat to reflux temperature (about 147° C.) and continue to heat for about 1½ hours. When cool it is ready for use.

As hereinbefore set forth, methods of preparation of oxazolines useful in this invention are known in the art and are not claimed as a portion of this invention.

The following examples illustrate the practice of this invention but are not intended as limitations.

*Example I*

A nitrocellulose primer coating composition, designated primer A, plasticized with a vinyl oxazoline tall oil diester was compared with a nitrocellulose primer coating composition, designated B, plasticized with a commonly used oxidizing alkyd resin plasticizer. Primer A was prepared by mixing a pigment grind with nitrocellulose solution, oxazoline plasticizer, and auxiliary plasticizer. The pigment grind was prepared by mixing together the ingredients tabulated below and grinding in a pebble mill to 5H fineness.

| Pigment grind: | Grams |
|---|---|
| Zinc chromate | 50 |
| Iron oxide | 255 |
| Talc | 195 |
| Vinyl oxazoline diester (tall oil acids) | 97.5 |
| Lacquer thinner | 350 |
| Composition, percent by wt.: | |
| Ethyl acetate | 30 |
| Methyl isobutyl ketone | 5 |
| Isopropyl alcohol | 19 |
| Toluene | 31 |
| Xylene | 15 |
| Total | 947.5 |

After the pigment grind was finished, it was mixed with nitrocellulose solution, 472 g., an additional amount of the same oxazoline plasticizer, 138.8 g., and auxiliary plasticizer (tricresyl phosphate), 39.5 g. The nitrocellulose solution had the following composition:

| Nitrocellulose solution: | Parts by wt. |
|---|---|
| Titanium dioxide | 27.5 |
| ½ sec. R.S. nitrocellulose wet with 30% alcohol | 43 |
| Butanol | 5 |
| Toluene | 50 |
| Ethyl acetate | 20 |
| Butyl acetate | 15 |

The finished metal primer A had the following composition:

| Primer A: | Grams |
|---|---|
| Pigment grind | 947.5 |
| Vinyl oxazoline diester | 138.8 |
| Auxiliary plasticizer | 39.5 |
| Nitrocellulose solution | 472 |

The primer B formulation was prepared in substantially the same manner but instead of the vinyl oxazoline diester plasticizer, a conventional short oil oxidizing alkyd was employed in the pigment and in the final formulation.

Eight metal panels, numbered 1 to 8, were coated with these two primer compositions. Panels 1 and 2 were coated with primer A and panels 3 and 4 were coated with primer B set at a film thickness of 1.5 mil, and panels 5 and 6 were coated with primer A and panels 7 and 8 were coated with primer B set at a film thickness of 3 mil. Primer A, that is, the primer coating composition plasticized with vinyl oxazoline diester prepared from tall oil acids, dried to a tack free film more rapidly than did primer B, the film plasticized with the alkyd.

After drying 72 hours these panels were top-coated with two different coating compositions or white lacquers, having the following general formula:

| | Parts by wt. |
|---|---|
| Titanium dioxide | 27.5 |
| ½ sec. R.S. nitrocellulose | 19.8 |
| Plasticizer | 44 |
| Auxiliary plasticizer | 7.3 |
| Lacquer solvents | 200 |

One white lacquer, designated lacquer C, was prepared by the above formula using the vinyl oxazoline diester prepared from tall oil acids and the second white lacquer, designated lacquer D, was prepared by the above formula using the same short oil oxidizing resin as employed in the primer. Primed panels 1, 3, 5 and 7 were then coated with lacquer C. Primed panels 2, 4, 6 and 8 were then coated with lacquer D.

After 24 hours drying, gloss readings were taken.

TABLE 1

| | White Lacquer | | | |
|---|---|---|---|---|
| | Panel No. | Oxazoline Plasticizer | Panel No. | Alkyd Plasticizer |
| 1.5 mil Primer Film: | | | | |
| Oxazoline plasticizer | 1 | [1] 71 | 2 | [1] 68 |
| Alkyd plasticizer | 3 | 62 | 4 | 55 |
| 3.0 mil Primer Film: | | | | |
| Oxazoline plasticizer | 5 | 65 | 6 | 63 |
| Alkyd plasticizer | 7 | 62 | 8 | 55 |

[1] Gloss.

The data in the above table show improved gloss resulting from the use of vinyl oxazoline diester of tall oil acids in primer coat and/or in the lacquer coat. Maximum gloss was obtained when both the top coat and primer were formulated with oxazoline plasticizer.

*Example II*

Example I was substantially repeated on another group of eight panels numbered 9 to 16 except that the oxazoline plasticizer was first partially polymerized by blowing air through it as is known in the art. The film plasticized with the blown oxazoline dried tack free on metal plates in about the same time as the raw, or unblown, oxazoline, but it gave a harder film. After drying, the primed metal plates were coated, as in Example I, with white lacquer plasticized with the blown oxazoline. The gloss readings obtained are as follows:

TABLE 2

| | Gloss of White Lacquer | | | |
|---|---|---|---|---|
| Primer Film | Panel No. | Blown Oxazoline Plasticizer | Panel No. | Alkyd Plasticizer |
| 1.5 mil Thickness: | | | | |
| Blown oxazoline plasticizer | 9 | 72 | 10 | 70 |
| Alkyd plasticizer | 11 | 62 | 12 | 55 |
| 3.0 mil Thickness: | | | | |
| Blown oxazoline plasticizer | 13 | 70 | 14 | 69 |
| Alkyd plasticizer | 15 | 62 | 16 | 55 |

Superior gloss was obtained by the use of blown oxazoline plasticizer diester of tall oil acids in the prime coat and/or in the lacquer coats. Again, maximum gloss was obtained when both the topcoat and primer were formulated with the blown oxazoline plasticizer.

*Example III*

This example demonstrates several of the desirable properties of nitrocellulose lacquer films plasticized with oxazolines. Using the nitrocellulose solution and lacquer thinner described in Example I, nine clear coating compositions were prepared with varying quantities of vinyl oxazoline diester prepared from tall oil acids. The oxazoline content ranged from one-half to two parts per one part of nitrocellulose. A control lacquer employing the short oil alkyd plasticizer used in Example I was prepared for comparsion. No pigments or hard resins were used in this series. The viscosity of these compositions was measured with a No. 2 Zahn cup and then 3 mil films were laid down and tested for hardness after one hour drying and sixty hours of drying. Film hardness was measured by pencils of increasing hardness by a method well known to those skilled in the art.

This example shows that nitrocellulose and vinyl oxazoline diester prepared from tall oil acids are compatible over a wide range. The viscosity tests surprisingly showed that the lowest viscosity was obtained with the highest oxazoline content which also gave the highest solids content. The highest viscosity occurred at the lowest oxazoline content and the lowest solids content.

The data in Table 3 show that the use of a high ratio of oxazoline to nitrocellulose gives lacquers of high solids content that yield films of satisfactory hardness. The use of a low ratio of oxazoline to nitrocellulose gives lacquers of high, but still useable, viscosity and lower solids content that yield films of good hardness. These oxazoline plasticizers are outstanding with respect to the latitude permitted the formulator.

TABLE 3

[Drier: 0.01% Cobalt]

| Lacquer No | 1 | 2 | 3 | 4 | 5 | 6 | 7 | 8 | 9 | 10 |
|---|---|---|---|---|---|---|---|---|---|---|
| Ingredients: | | | | | | | | | | |
| Nitrocellulose solution, g | 86 | 86 | 86 | 86 | 86 | 86 | 86 | 86 | 86 | 86 |
| Alkyd plasticizer, g | 65.8 | | | | | | | | | |
| Auxiliary plasticizer, g | 7.2 | 7.2 | | | | | | | | |
| Oxazoline plasticizer, g | | 42.8 | 42.8 | 37.8 | 32.8 | 27.0 | 22 | 17 | 12 | 10.8 |
| Lacquer thinner, g | 64 | 87 | 77 | 70 | 63 | 54.8 | 47.9 | 40.9 | 33.9 | 32.3 |
| Solids, percent | 32 | 32 | 31 | 30.5 | 30 | 29 | 28 | 27 | 25 | 25 |
| Parts by wt. oxazoline/1 part nitrocellulose | | 2 | 2 | 1.75 | 1.51 | 1.25 | 1.02 | 0.79 | 0.56 | 0.50 |
| Viscosity, sec | 52 | 25 | 28 | 31 | 35 | 41 | 47 | 55 | 73 | 76 |
| Pencil hardness, 3 mil film:[1] | | | | | | | | | | |
| One hour | 3B | 5B | 5B | 5B | 5B | 5B | 5B | 5B | 4B | 3B |
| Sixty hour | 3B | 5B | 3B | 3B | 3B | 2B | B | B | HB | F |

[1] Softer than.

*Example IV*

It is customary to apply to raw, unfinished wood objects a preliminary coat known as a sanding sealer to seal the pores, and, by stiffening the fiber ends, to assist in sanding the surfaces. A hard, rather brittle film is desirable to assist the sanding operation, but such films often show checking upon exposure of the coated article to low temperatures, and the general appearance is marred.

A sealer was formulated with the vinyl oxazoline diester of tall oil acids according to the following solids formula and then dissolved in a lacquer thinner:

Solids formulation—sanding sealer:                  Percent

½ sec. R.S. nitrocellulose (dry basis _____ 50
    Maleic resin _____ 32.5
    Oxazoline plasticizer _____ 17.5
    Zinc stearate _____ 5

This sealer had good sanding properties, and in spite of the high, hard-resin content, it did not check as a result of exposure to low temperatures.

The hold out of this sealer was better than a conventional sealer used for control, and the viscosity and cost were approximately equal to the control.

*Example V*

A superior property of the nitrocellulose compositions of this invention is their high initial gloss and gloss retention on exposure as a result of resistance to chalking. The data in the following table show this clearly. The formula for a white pigmented top coat lacquer given in Example I plus 0.02% cobalt drier was used as the basic formula, but other examples of oxazoline plasticizers and commonly used alkyds were used as the plasticizer on an equal weight basis.

TABLE 4

| Plasticizer | Gloss | |
|---|---|---|
| | Initial | Final |
| Vinyl oxazoline tall oil acid diester | 81 | 33 |
| Vinyl oxazoline tall oil acid diester, blown | 91 | 59 |
| Vinyl oxazoline coconut acid diester | 87 | 70 |
| Styrenated vinyl oxazoline polyester | 88 | 20 |
| Vinyl oxazoline polyester | 88 | 29 |
| Commercial lacquer | 57 | 28 |
| Commercial oxidizing alkyd A | 92 | 13 |
| Commercial oxidizing alkyd B | 92 | 11 |
| Commercial non-oxidizing alkyd | 89 | 65 |

Having described this invention, what is claimed is:

1. A nitrocellulose coating composition comprising nitrocellulose and a plasticizing amount of an oxazoline selected from the group consisting of A, B, C, D, E, F, G and H and mixtures thereof wherein: A is an oxazoline represented by the formula

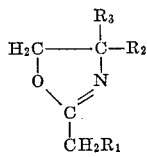

where $R_1$ is selected from the group consisting of hydrogen and saturated and unsaturated alkyl radicals containing from 1 to about 20 carbon atoms; and $R_2$ and $R_3$ are selected from the group consisting of hydrogen, alkyl and alkylol radicals of from 1 to 5 carbon atoms and the radical

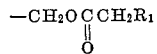

B is an oxazoline represented by the formula

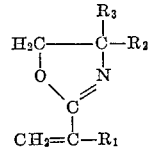

C is a polymeric oxazoline reaction product obtained by partially polymerizing B by contact with air;
D is an oxazoline reaction product obtained by reacting B with a compound having a terminal group represented by the formula

selected from the group consisting of ethylene, propylene, isobutylene, acrylonitrile, methyl methacrylate, ethylmethacrylate, butyl methacrylate, octyl methacrylate, cyclohexyl methacrylate, methoxymethyl methacrylate, n-butoxyethyl methacrylate, n-butoxyethoxyethyl methacrylate, beta-diethylaminoethyl methacrylate, chloroethyl methacrylate, methacrylic acid, ethyl acrylate, alpha-chloroacrylic acid, vinyl chloride, vinyl fluoride, vinylidene chloride, vinylidene fluoride, vinyl acetate, vinyl trimethylacetate, vinyl hexanoate, vinyl laurate, vinyl chloroacetate, vinyl propionate, vinyl stearate, N-vinyl phthalimide, N-vinyl succinimide, N-vinylcaprolactam, N-vinylbutyrolactam, styrene, methyl styrene, vinyl toluene, vinylnaphthalene, methyl vinyl ketone, vinylpyridine, vinyl isobutyl ether, vinyl ethyl ether, vinyl alcohol and mixtures thereof;
E is an oxazine polyester reaction product obtained by reacting about one mole of a thermally stable, dicarboxylic acid which does not readily form an anhydride with from about 1 to 2 moles of an oxazoline represented by the formula

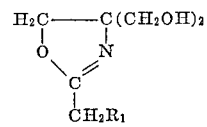

F is an olefinic oxazoline polyester reaction product obtained by reacting E with formaldehyde;
G is an oxazoline reaction product obtained by reacting F with a compound having a terminal group represented by the formula

selected from the same group as hereinabove set forth in describing oxazoline product D;
H is a dioxazoline ester reaction product obtained by reacting about 1 mole of a dicarboxylic acid with about 2 moles of an oxazoline represented by the formula

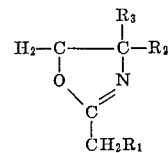

wherein only one of the members $R_2$ and $R_3$ is alkylol.

2. A nitrocellulose coating composition comprising nitrocellulose and from about 0.05 to about 10 parts by weight per part by weight of nitrocellulose of an oxazoline represented by the formula

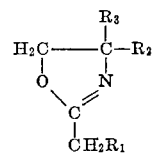

wherein $R_1$ is selected from the group consisting of hydrogen and saturated and unsaturated alkyl radicals containing from 1 to about 20 carbon atoms; where $R_2$ and $R_3$ are selected from the group consisting of hydrogen, alkyl and alkylol radicals containing from 1 to 5 carbon atoms and

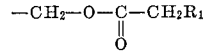

3. The nitrocellulose coating composition of claim 2 wherein $R_2$ is a methyl radical and $R_3$ is a hydroxymethyl radical.

4. The nitrocellulose coating composition of claim 2 wherein $R_2$ is a methyl radical and $R_3$ is represented by the formula

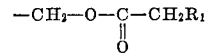

5. The nitrocellulose coating composition of claim 2 wherein $R_2$ and $R_3$ are represented by the formula

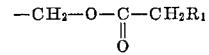

6. The nitrocellulose coating composition of claim 2 wherein $R_2$ is an ethyl radical and $R_3$ is

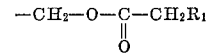

7. A nitrocellulose coating composition comprising nitrocellulose and from about 0.05 to about 10 parts by weight per part by weight of nitrocellulose of an oxazoline represented by the formula

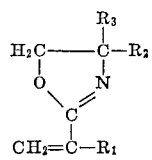

where $R_1$ is selected from the group consisting of hydrogen and saturated and unsaturated alkyl radicals containing from 1 to about 20 carbon atoms; and $R_2$ and $R_3$ are selected from the group consisting of hydrogen, alkyl, and alkylol radicals of from 1 to 5 carbon atoms and the radical

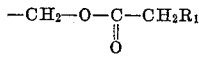

8. A nitrocellulose coating composition comprising nitrocellulose and from about 0.05 to about 10 parts by weight per part by weight of nitrocellulose of a partially polymerized oxazoline obtained by partially polymerizing by contact with air an oxazoline represented by the formula

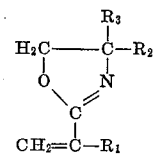

where $R_1$ selected from the group consisting of hydrogen and saturated and unsaturated alkyl radicals containing from 1 to about 20 carbon atoms and $R_2$ and $R_3$ are selected from the group consisting of hydrogen, alkyl and alkylol radicals containing from 1 to 5 carbon atoms and

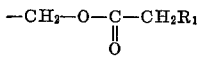

9. The nitrocellulose coating composition of claim 8 where $R_2$ and $R_3$ are saturated alkyl radicals.

10. The nitrocellulose coating composition of claim 8 where $R_2$ is a methyl radical and $R_3$ is represented by the formula

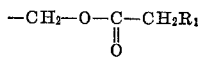

11. The nitrocellulose coating composition of claim 8 where $R_2$ and $R_3$ are each represented by the formula

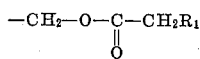

12. The nitrocellulose coating composition of claim 8 where $R_2$ is a methyl radical and $R_3$ is a hydroxymethyl radical.

13. The nitrocellulose coating composition of claim 8 where $R_2$ and $R_3$ are hydroxymethyl radicals.

14. A nitrocellulose coating composition comprising nitrocellulose and from about 0.05 to about 10 parts by weight per part by weight of nitrocellulose of an oxazoline polyester reaction product obtained by reacting about 1 mol of a thermally stable dicarboxylic acid which does not readily form an anhydride with from about 1 to about 2 moles of an oxazoline represented by the formula

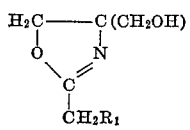

where $R_1$ is selected from the group consisting of saturated and unsaturated alkyl radicals containing from 1 to about 20 carbon atoms.

15. The nitrocellulose coating composition of claim 14 wherein said dicarboxylic acid is an aliphatic dicarboxylic acid represented by the formula $(CH_2)_x(COOH)_2$ wherein $x$ is an integer of from 4 to about 20.

16. The nitrocellulose coating composition of claim 14 wherein said dicarboxylic acid is a non-anhydride-forming dicarboxylic acid of the aromatic series.

17. A nitrocellulose coating composition comprising nitrocellulose and from about 0.05 to about 10 parts of the olefinic oxazoline polyester reaction product obtained by reacting with formaldehyde the oxazoline polyester reaction product of claim 14.

18. A nitrocellulose coating composition comprising nitrocellulose and from about 0.05 to about 10 parts of an oxazoline reaction product obtained by reacting the olefinic polyester oxazoline reaction product of claim 17 with a compound having a terminal group represented by the formula

selected from the group consisting of ethylene, propylene, isobutylene, acrylonitrile, methyl methacrylate, ethylmethacrylate, butyl methacrylate, octyl methacrylate, cyclohexyl methacrylate, methoxymethyl methacrylate, n-butoxyethyl methacrylate, n-butoxyethoxyethyl methacrylate, beta-diethylaminoethyl methacrylate, chloroethyl methacrylate, methacrylic acid, ethyl acrylate, alpha-chloroacrylic acid, vinyl chloride, vinyl fluoride, vinylidene chloride, vinylidene fluoride, vinyl acetate, vinyl trimethylacetate, vinyl hexanoate, vinyl laurate, vinyl chloroacetate, vinyl propionate, vinyl stearate, N-vinyl phthalimide, N-vinyl succinimide, N-vinylcaprolactam, N-vinylbutyrolactam, styrene, methyl styrene, vinyl toluene, vinylnaphthalene, methyl vinyl ketone, vinylpyridine, vinyl isobutyl ether, vinyl ethyl ether, vinyl alcohol and mixtures thereof.

19. A nitrocellulose coating composition comprising nitrocellulose and from about 0.05 to about 10 parts by weight per part by weight of nitrocellulose of an oxazoline reaction product obtained by reacting a compound having a terminal group represented by the formula

selected from the group consisting of ethylene, propylene, isobutylene, acrylonitrile, methyl methacrylate, ethylmethacrylate, butyl methacrylate, octyl methacrylate, cyclohexyl methacrylate, methoxymethyl methacrylate, n-butoxy-ethyl methacrylate, n-butoxyethoxyethyl methacrylate, betadiethylaminoethyl methacrylate, chloroethyl methacrylate, methacrylic acid, ethyl acrylate, alpha-chloroacrylic acid, vinyl chloride, vinyl fluoride, vinylidene chloride, vinylidene fluoride, vinyl acetate, vinyl trimethylacetate, vinyl hexanoate, vinyl laurate, vinyl cloroacetate, vinyl propionate, vinyl stearate, N-vinyl phthalimide, N-vinyl succinimide, N-vinylcaprolactam, N-vinylbutyrolactam, styrene, methyl styrene, vinyl toluene, vinylnaphthalene, methyl vinyl ketone, vinylpyridine, vinyl isobutyl ether, vinyl ethyl ether, vinyl alcohol and mixtures thereof with an oxazoline having the formula

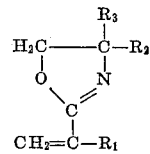

where $R_1$ is selected from the group consisting of saturated and unsaturated alkyl radicals containing from 1 to about 20 carbon atoms, $R_2$ is a saturated alkyl radical of from 1 to 5 carbon atoms and $R_3$ is an alkylol group of from 1 to 5 carbon atoms.

20. A nitrocellulose coating composition comprising nitrocellulose and from about 0.05 to about 10 parts by weight per part by weight of nitrocellulose of a dioxazoline ester reaction product obtained by reacting about one mole of dicarboxylic acid with about two moles of an oxazoline represented by the formula

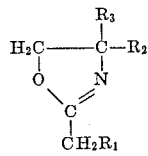

where $R_1$ is selected from the group consisting of saturated and unsaturated alkyl radicals containing from one to about 20 carbon atoms, $R_2$ is a saturated alkyl radical of from 1 to 5 carbon atoms and $R_3$ is an alkylol group of from 1 to 5 carbon atoms.

No references cited.

WILLIAM H. SHORT, *Primary Examiner.*

J. NORRIS, *Assistant Examiner.*

UNITED STATES PATENT OFFICE
CERTIFICATE OF CORRECTION

Patent No. 3,336,145         August 15, 1967

Robert F. Purcell

It is hereby certified that error appears in the above numbered patent requiring correction and that the said Letters Patent should read as corrected below.

Column 2, lines 46 to 53, for that portion of the formula reading: $\overset{|}{\underset{\diagup\!\!\diagup}{H}}$ read 
column 3, line 68, for "nitorcellulose" read -- nitrocellulose --; line 71, for "to" read -- and --; column 6, line 9, for "given" read -- give --; line 63 and lines 70 and 71, for "parafomaldehyde", each occurrence, read -- paraformaldehyde --; column 8, line 30, strike out "Titanium dioxide----27.5"; column 10, line 53, after "basis" insert a closing parenthesis; column 11, line 73, for "oxazine" read -- oxazoline --.

Signed and sealed this 7th day of January 1969.

(SEAL)
Attest:

EDWARD M. FLETCHER, JR.
Attesting Officer

EDWARD J. BRENNER
Commissioner of Patents